United States Patent [19]

Wada

[11] Patent Number: 5,615,961
[45] Date of Patent: Apr. 1, 1997

[54] MATERIAL CONVEYING METHOD AND APPARATUS AND MATERIAL PROCESSING APPARATUS

[75] Inventor: Koji Wada, Kanagawa, Japan

[73] Assignee: Fuji Photo Film Co., Ltd., Kanagawa, Japan

[21] Appl. No.: 77,043

[22] Filed: Jun. 16, 1993

[30] Foreign Application Priority Data

Jun. 18, 1992 [JP] Japan .................................... 4-159257

[51] Int. Cl.$^6$ .................................................. B41J 15/16
[52] U.S. Cl. ........................... 400/619; 400/636; 226/192
[58] Field of Search ..................................... 400/617, 618, 400/619, 636, 636.2, 636.3, 641, 636.1, 637.3; 346/136; 347/101, 104, 264; 226/181, 182, 189, 192

[56] References Cited

U.S. PATENT DOCUMENTS

| | | | |
|---|---|---|---|
| 848,560 | 3/1907 | Kunath | 400/637.3 |
| 853,249 | 5/1907 | Lundeberg | 400/618 |
| 1,386,969 | 8/1921 | Smith | 400/618 |
| 3,606,127 | 9/1971 | Brown | 226/190 |
| 3,620,481 | 11/1971 | Stewart | 242/303 |
| 4,729,557 | 3/1988 | Kiyohara | 400/641 |

FOREIGN PATENT DOCUMENTS

| | | |
|---|---|---|
| 1224020 | 6/1960 | France . |
| 2422562 | 11/1974 | Germany . |
| 3725697 | 11/1988 | Germany . |
| 55-090366 | 7/1980 | Japan .................................... 400/641 |
| 58-016872 | 1/1983 | Japan .................................... 400/641 |
| 731595 | 6/1955 | United Kingdom . |

OTHER PUBLICATIONS

Research Disclosure, No. 183, Jul. 1979, Havant GB, p. 369, F.D. Hauck 'Means for transporting photothermographic materials'.
Patent Abstracts of Japan, vol. 12, No. 364 (M–747) (3211) 29 Sep. 1988.

*Primary Examiner*—David A. Wiecking
*Attorney, Agent, or Firm*—Sughrue, Mion, Zinn, Macpeak & Seas

[57] ABSTRACT

A material conveying apparatus. A pair of winding and guiding rollers are spaced apart from a rotating drum. The winding and guiding rollers are adapted to guide a material according to the curvature of the rotating drum and wind it around a part of the outer circumference thereof. At least one nipping roller is in contact with the outer circumference of tile rotating drum. The at least one nipping roller has an elastic member which deforms according to the curvature of the outer circumference of the rotating drum. In addition, the at least one nipping roller has a plurality of roller portions disposed along the axial line of the rotating drum. Each of the roller portions is independently rotatable. At a material winding portion defined by the pair of winding and guiding rollers, the at least one nipping roller is pressed into contact with the outer circumference of the rotating drum at a material winding portion by the pair of winding and guiding rollers, so that the at least one nipping roller rotates correspondingly with respect to the rotating drum at the material winding portion, the material is nipped between the rotating drum and the at least one nipping roller, and the nipping roller applying conveying force to the material.

17 Claims, 9 Drawing Sheets

MATERIAL CONVEYING METHOD AND APPARATUS AND MATERIAL PROCESSING APPARATUS

BACKGROUND OF THE INVENTION

1. Field of the Invention

The present invention relates to a material conveying apparatus for conveying a material corresponding to rotations of a rotating drum. The present invention also relates to a material processing apparatus for winding a material around the outer circumference of the rotating drum corresponding to the rotations thereof so as to perform an image recording process or an image reading process.

2. Description of the Related Art

An image recording apparatus for tightly winding a material around the outer circumference of a rotating drum and for performing a process such as an image recording process is known.

In the image recording apparatus of this type, the rotating drum is constructed of a metal which is independently rotatable. The rotating drum is in pressing contact with a rubber nipping roller. As the rotating drum is driven, the nipping roller correspondingly rotates. As an example of the material, a photosensitive material (such as a film) is used. When the photosensitive material is supplied between the rotating drum and tile nipping roller, the photosensitive material is nipped and conveyed by the same.

When an image recording process is performed, the photosensitive material is nipped and conveyed by the rotating drum and the nipping roller. During this conveying process, the photosensitive material is wound around the outer circumference of the rotating drum. An image is exposed onto the photosensitive material by a laser diode (LD) or the like. This exposing process is referred to as drum capstan exposure method.

However, with such an image recording apparatus, a very high register tolerance is required. For example, when a photosensitive material whose width is 450 mm and longitudinal size is 600 mm is used, the required register tolerance is 30 µm or less.

Nevertheless, in the conventional image recording apparatus (conveying means) which exposes (records) an image on a photosensitive material being conveyed to it by the above-described rotating drum and the nipping roller, the register tolerance of the image tends to be degraded.

In other words, the deviation of the outer diameter of each portion along the axial line of the above-described rubber nipping roller affects the linear velocity of each circumferential portion along the axial line. Thus, the conveying velocity of the photosensitive material along the axial line by the rotating drum and the nipping roller deviates. In addition, a uniform distribution of the nipping force along the axial line of the nipping roller causes the nipping roller to expand or shrink. Thus, the outer diameter of each portion of the nipping roller varies. Thereby, the rotating circumferential velocity of each portion along the axial line of the nipping roller deviates. The deviation of the linear velocity of each circumferential portion results in a deviation of the conveying velocity along the axial line of the photosensitive material. Moreover, the uniform distribution of the nipping force along the axial line of the nipping roller causes the curvature along the axial line of the photosensitive material at the nipping portion to deviate. The deviation of the curvature results in a deviation of the conveying velocity along the axial line of the photosensitive material.

As the photosensitive material is conveyed, the deviation of the conveying velocity along the axial line of the photosensitive material results in a distortion thereof. Accordingly, a distortion is produced in the exposed image.

In particular, as in a so-called two-up process of an image recording apparatus where separation plates of four colors separated from a color image are disposed in such a way that two are on an upper row of a photosensitive material and the other two are on the lower row thereof, when not only the repeatability of image but a distortion of an exposed image directly affects the register tolerance, the image quality seriously deteriorates.

Moreover, when a color image is recorded on a photosensitive material by a plurality of reciprocative exposing processes, the distortion of the photosensitive material which takes place during the conveying process results in a color distortion or the like. Thus, the quality of the image being exposed is remarkably degraded.

SUMMARY OF THE INVENTION

From the above-described view, an object of the present invention is to provide a material conveying apparatus for uniformly conveying a material corresponding to the rotations of a rotating drum and without material deviation. Another object of the present invention is to provide a material processing apparatus for winding a material around the outer circumference of a rotating drum corresponding to the rotations thereof so as to uniformly record or read an image without distortion in an image recording process or an image reading process.

A first aspect of the present invention is a material conveying method, comprising the steps of disposing a pair of winding and guiding rollers, spaced apart from a rotating drum, for winding and guiding a material, guiding the material and winding it around a part of the outer circumference of the rotating drum according to the curvature thereof by the pair of winding and guiding rollers, disposing a nipping roller at a winding portion of the material on the rotating drum, the nipping roller being in pressing contact with the outer circumference of the rotating drum and rotated corresponding thereto, and nipping the material by the rotating drum and the nipping roller and conveying the material by only a conveying force in a conveying direction.

A second aspect of the present invention is a material conveying apparatus, comprising a rotating drum, a pair of winding and guiding rollers, spaced apart from the rotating drum, for guiding the material according to the curvature of the rotating drum and for winding the material around a part of the outer circumference of the rotating drum, and at least one nipping roller having an elastic member which contacts the outer circumference of the rotating drum and is deformed according to the curvature of the rotating drum, the at least one nipping roller having a plurality of roller portions disposed along the axial line of the rotating drum, the roller portions being independently rotatable, at least one nipping roller having an elastic member in contact with the outer circumference of the rotating drum and deformed according to the curvature of the rotating drum, the at east one nipping roller having a plurality of roller portions disposed along the axial line of the rotating drum, the roller portions being independently rotatable, the at least one nipping roller being pressed against the outer circumference of the rotating drum at a material winding portion by the pair of winding and guiding rollers, so that the at least one nipping roller rotates correspondingly with respect to the rotating drum at the material winding portion, the material being nipped between the rotating drum and the at least one nipping roller, and the nipping roller applying conveying force to the material.

A third aspect of the present invention is a material processing apparatus, comprising a rotating drum, a pair of winding and guiding rollers, spaced apart from the rotating drum, for guiding tile material according to the curvature of the rotating drum and for winding the material around a part of the outer circumference of the rotating drum, at least one nipping roller having an elastic member which is pressed against outer circumference of the rotating drum and deformed according to the curvature of the rotating drum, the at least one nipping roller having a plurality of roller portions disposed along the axial line of the rotating drum, the roller portions being independently rotatable, the at least one nipping roller being pressed and contacted onto a winding portion of said material by the winding and guiding rollers, the winding portion being a part of the outer circumference of the rotating drum, the roller portions being independently rotatable, the at least one nipping roller being pressed against the outer circumference of the rotating drum at a material winding portion by the pair of winding and guiding rollers, so that the at least one nipping roller rotates correspondingly with respect to the rotating drum at the material winding portion, the material being nipped between the rotating drum and the at least one nipping roller, and the at least one nipping roller applying conveying force to the material, and image recording and reading means for performing either an image recording process or an image reading process for the material conveyed at the material winding portion.

According to the recording material conveying method of the first aspect, a material is guided by a pair of winding and guiding rollers and wound around the outer circumference of a rotating drum. The material is nipped and conveyed by at least one nipping roller pressed and contacted onto a material winding portion of the outer circumference of the rotating drum. With the conveying force of the nipping roller, the material is wound around a part of the outer circumference of tile rotating drum and conveyed.

Even if the conveying velocity at each portion of the material nipping portion along the axial line of the rotating drum (the conveying velocity of the material) deviates because of, for example, a deviation of the outer diameter of each portion along the axial line of the nipping roller and a change of the outer diameter of each portion thereof caused by expansion or shrinkage thereof due to a deviation of the nipping force, the material is nipped and conveyed by the nipping roller. Therefore, the material is uniformly conveyed without a distortion.

According to the recording material conveying apparatus of the second aspect, a material is guided by a pair of winding and guiding rollers and wound around the outer circumference of a rotating drum. The material is nipped and conveyed by a nipping roller which is in pressing contact with a material winding portion of the outer circumference of the rotating drum. With the conveying force, the material is wound around a part of the outer circumference and conveyed.

Since the nipping roller is made of an elastic member which deforms according to the curvature of the rotating drum, the winding condition of the material against the rotating drum does not change. In addition, the nipping roller has a plurality of roller portions disposed along the axial line thereof, each roller portion being independently rotatable. Thus, even if the conveying force (conveying velocity) at each portion of the material nipping portion along the axial line of the rotating drum deviates because of, for example, a deviation of the outer diameter of each portion along the axial line of the nipping roller and a change of the outer diameter of each portion thereof caused by expansion or shrinkage thereof due to a deviation of the nipping force, the deviation is absorbed by each roller portion and does not affect each portion. Therefore, the material is uniformly conveyed without a distortion.

According to the material processing apparatus of the third aspect, the material is guided by a pair of winding and guiding rollers and wound around the outer circumference of the rotating drum. The material is nipped and conveyed by a nipping roller which is in pressing contact with a material winding portion of the outer circumference of the rotating drum. With the conveying force, the material is wound around a part of the outer circumference and conveyed. During the conveying process, an image is recorded on or read from the photosensitive material which is wound around the outer circumference of the rotating drum.

Since the nipping roller is made of an elastic member which deforms according to the curvature of the rotating drum, the winding condition of the material against the rotating drum does not change. In addition, the nipping roller has a plurality of roller portions disposed along the axial line thereof, each roller portion being independently rotatable. Thus, even if the conveying force (conveying velocity) at each portion of the material nipping portion along the axial line of the rotating drum deviates because of, for example, a deviation of the outer diameter of each portion along the axial line of the nipping roller and a change of the outer diameter of each portion thereof caused by expansion or shrinkage thereof due to a deviation of the nipping force, the deviation is absorbed by each roller portion and does not affect each portion. Therefore, the material is uniformly conveyed without a distortion.

Thus, an image is uniformly recorded on or read from the material which is wound around the outer circumference of the rotating drum and without distortion.

In particular, as in the so-called two-up process of a photoengraving process, when not only the repeatability of image is but distortion of an exposed image directly effected the register tolerance, the image quality is remarkably improved due to absence of distortion. Thus, in this case, the present invention can be effectively used. Moreover, when a color image is recorded on a photosensitive material by a plurality of reciprocative exposing processes, since the absence of distortion of the photosensitive material during the conveying process results in no color distortion, the image quality is remarkably improved. Thus, in this case, the present invention can be effectively used.

These and other objects, features and advantages of the present invention will become more apparent in light of the following detailed description of a best mode embodiment thereof, as illustrated in the accompanying drawings.

DETAILED DESCRIPTION OF PREFERRED EMBODIMENT

Figure 1:
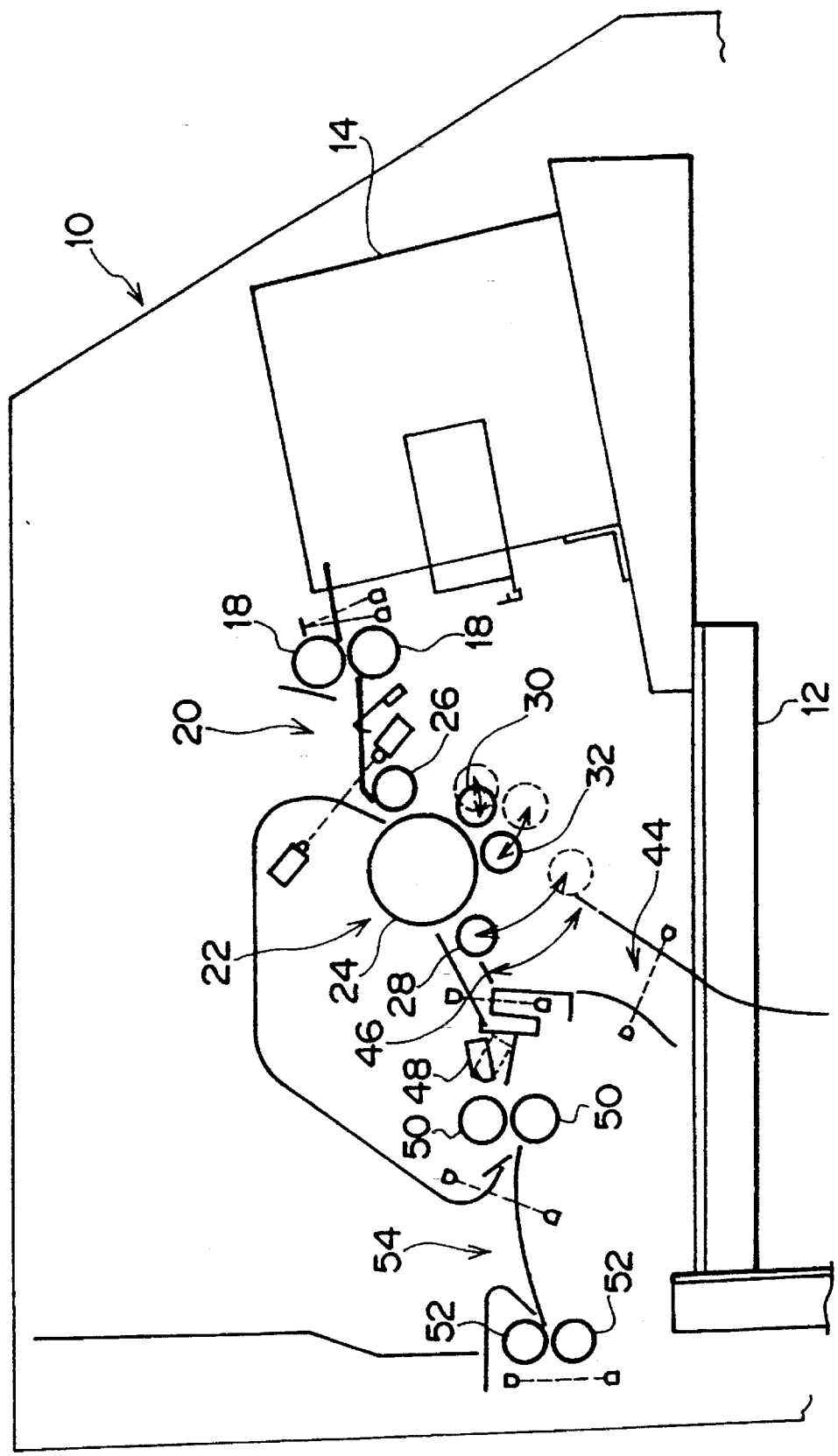
FIG. 1 is a sectional view schematically showing the construction of a principal portion (recording material conveying mechanism) of a material conveying apparatus according to an embodiment of the present invention.

FIG. 1 is a sectional view schematically showing the construction of a principal portion (recording material conveying mechanism) of a material conveying apparatus 10 according to an embodiment of the present invention.

A photosensitive material magazine 14 is disposed over a table 12 of the material conveying apparatus 10. A photosensitive material 16 (not illustrated in FIG. 1) is wound in a rolled shape and housed in the photosensitive material magazine 14. In this embodiment, the photosensitive material 16 has a width of 450 mm. The photosensitive material 16 is wound in such a way that the photosensitive (exposing) side thereof faces downward.

On one side of the photosensitive material magazine 14, a feed roller 18 which extracts the photosensitive material 16 from the photosensitive material magazine 14 is disposed.

On one side of the feed roller 18 (on the opposite side the photosensitive material magazine 14), an exposure loop section 20 is disposed. The exposure loop section 20 bends the photosensitive material 16 in a loop shape and keeps it in a ready state.

On one side of the exposure loop section 20, a recording section 22 is disposed. The photosensitive material 16 is conveyed to the recording section 22.

Figure 2:
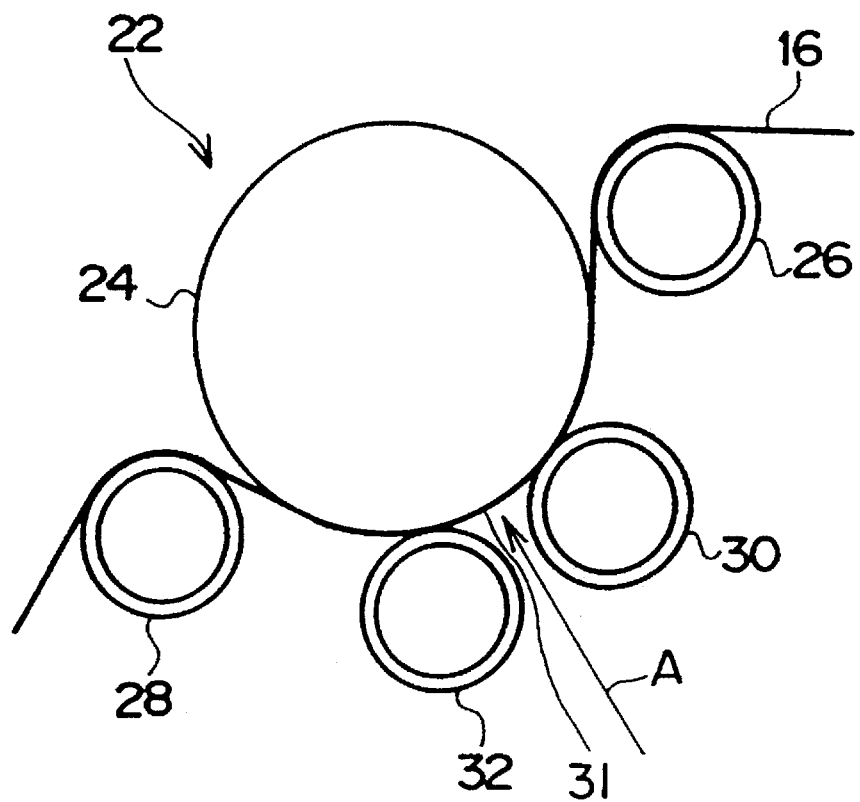
FIG. 2 is a sectional view showing the positions of a rotating drum, winding and guiding rollers, and nipping rollers of the material conveying apparatus.

As shown in FIG. 2, the recording section 22 comprises a rotating drum 24, a pair of winding and guiding rollers 26 and 28, and a pair of nipping rollers 30 and 32.

The rotating drum 24 is formed of a thin-wall aluminum pipe. In this embodiment, the outer diameter and the axial effective width of the rotating drum 24 are 60 mm and 470 mm, respectively. In addition, the circumferential dimensional tolerance and the radial dimensional tolerance of the rotating drum 24 are 3 μm or less and 1 μm or less, respectively. The rotating drum 24 is driven and rotated by a motor (not shown) at a circumferential velocity of 4 mm/sec. Instead of the rotating drum 24, another rotating drum whose outer diameter is 180 mm, circumferential dimensional tolerance is 9 μm or less, and radial dimensional tolerance is 3 μm or less may be used.

The pair of winding and guiding rollers 26 and 28 are formed of thin-wall aluminum pipes. In this embodiment, the outer diameter and the axial effective width of the winding and guiding rollers 26 and 28 are 25 mm and 464 mm, respectively. The axial effective width of the winding and guiding rollers 26 and 28 almost accords with that of the rotating drum 24. Each of the winding and guiding rollers 26 and 28 is spaced apart from the rotating drum 24 by 2 mm. The distance between the winding and guiding rollers 26 and 28 and the drum 24 is preferably 1 mm or more.

Figure 3:
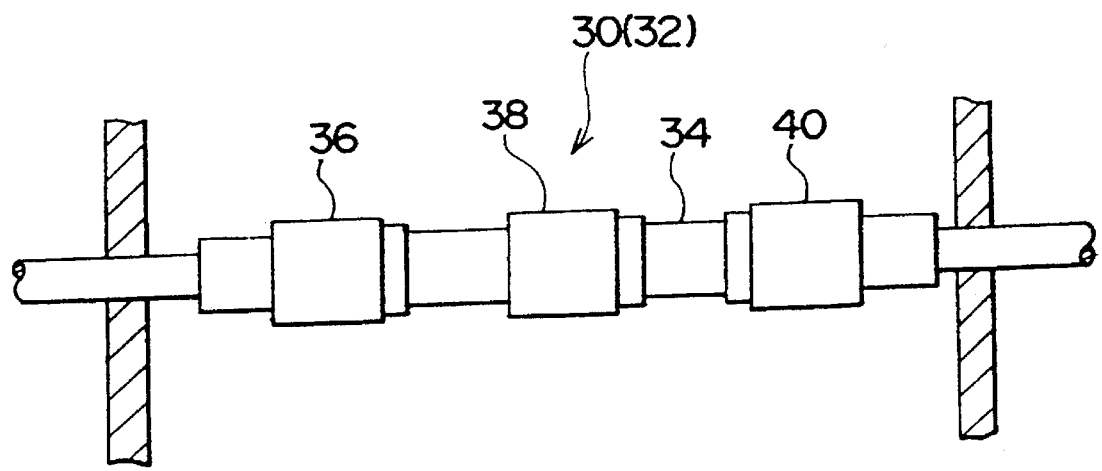
FIG. 3 is a front view showing the nipping roller.
Figure 4:
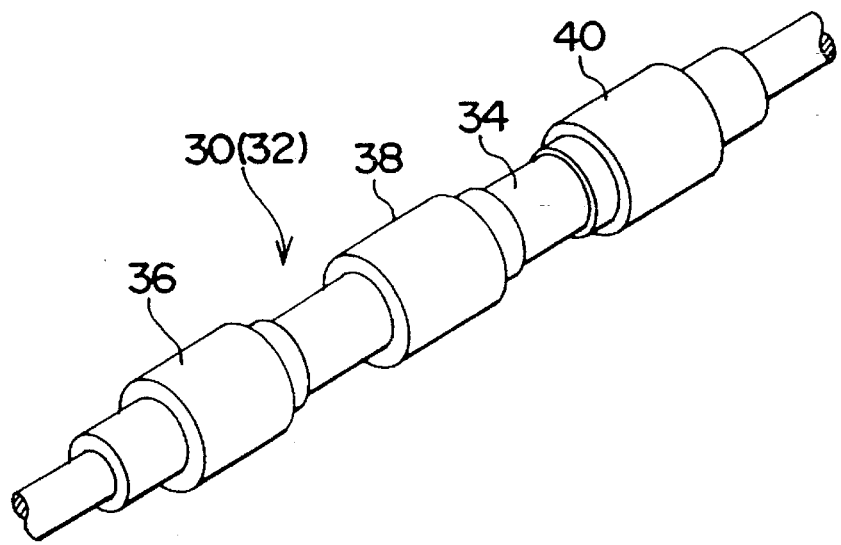
FIG. 4 is a perspective view showing the nipping roller.
Figure 5:
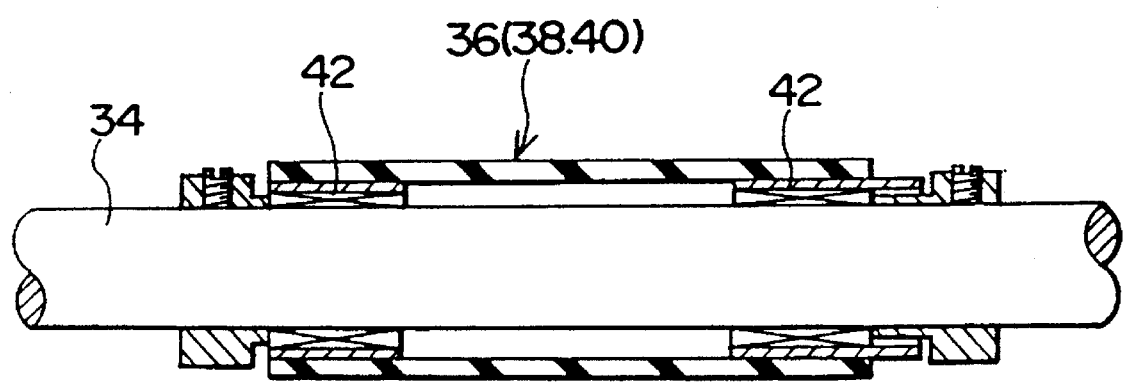
FIG. 5 is a sectional view showing the nipping roller.

The nipping rollers 30 and 32 have the same construction. The nipping rollers 30 and 32 are disposed between the winding and guiding rollers 26 and 28. As shown in FIGS. 3 and 4, each of the nipping rollers 30 and 32 has three roller portions 36, 38, and 40 which are disposed on a shaft 34 thereof. As shown in FIG. 5, the rollers 36, 38, and 40 are mounted on the shaft 34 through respective bearings 42. Thus, the roller portions 36, 38, and 40 are rubber rollers which are independently rotatable. The outer diameter and the axial width of each of the rollers 36, 38, and 40 are 25 mm and 75 mm, respectively. The wall thickness and the hardness of the rubber portions of these roller portions are 5 mm and 60 degrees, respectively. The space between these roller portions 36, 38, and 40 is approximately 93 mm.

Both end portions in the longitudinal direction of each of the nipping rollers 30 and 32 are in pressing contact with the outer circumference of the rotating drum 24 of a pressure of 1 to 2 kg. Since the nipping rollers 30 and 32 are in pressing contact with the outer circumference of the rotating drum 24 according to the curvature thereof, they are correspondingly rotated by the rotating drum 24. Thus, the nipping rollers 30 and 32 nip and convey the photosensitive material 16 along with the rotating drum 24. In this embodiment, the circumferential nipping width (the nipping region) of each of the nipping rollers 30 and 32 is approximately 1 to 2 mm.

As shown in FIGS. 1 and 2, an exposing portion 31 (an exposing point) is disposed between the nipping rollers 30 and 32. While the photosensitive material 16 which is wound around the rotating drum 24 is being conveyed, an image is exposed and recorded on the photosensitive material 16.

The nipping rollers 30 and 32 and the winding and guiding roller 28 are movable to and apart from the rotating drum 24 by a rotating unit (not shown). Thus, when the nipping rollers 30 and 32 and the winding and guiding roller 28 are spaced apart from the rotating drum 24, the photosensitive material 16 which is wound around the winding and guiding roller 28 can be conveyed below the rotating drum 24.

The nipping rollers 30 and 32 are disposed such that the relative space therebetween is 4 mm. Further, an angle which is formed by, on the one hand, a line connecting the axial center of the rotating drum 24 and the axial center of the nipping roller 30, and on the other hand, a line connecting axial center of the rotating drum 24 and the axial center of the winding and guiding roller 26, is 60 degrees. Moreover, an angle which is formed by, on the one hand, a line connecting the axial center of the rotating drum 24 and the axial center of the nipping roller 32, and, on the other hand, a line connecting the axial center of the rotating drum 24 and the axial center of the winding and guiding roller 28, is also 60 degrees. Thus, the positions of these rollers can be defined by the relative angle thereof. In addition, the positions of the winding and guiding rollers 26 and 28 may be defined by the distance from the nip regions of the nipping rollers 30 and 32. In this case, the winding and guiding rollers 26 and 28 should be disposed so that the length of the contacting regions of the photosensitive material 16 and the rotating drum 24 becomes approximately 5 mm or more measured from the nipping regions of the nipping rollers 30 and 32.

Below the recording section 22 (namely, below the winding and guiding roller 28 and the nipping roller 32), an exposure ready portion 44 is disposed. In other words, when the nipping rollers 30 and 32 and the winding and guiding roller 28 are moved and spaced apart from the rotating drum 24, the photosensitive material 16 which is wound around the winding and guiding roller 26 is temporarily conveyed to the exposure ready portion 44 and kept in ready state.

Below the recording section 22 (namely, on one side of the exposure ready portion 44 and below the nipping rollers 30 and 32 which are in pressing contact with the rotating drum 24), an exposing unit (not shown) is disposed. The exposing unit vertically (namely, in the direction of arrow A of FIG. 2) scans, exposes, and records an image on the front side of the photosensitive material 16 which is wound around the outer circumference of the rotating drum 24 (namely, between the nipping rollers 30 and 32) by a laser diode (LD) or the like. In other words, the exposing unit performs an exposing process according to a so-called drum capstan method.

On one side of the recording section 22, a guide plate 46, a cutter 48, and a pair of conveying rollers 50 are disposed.

As with the winding and guiding roller 28, the guide plate 46 is slidably disposed. When the guide plate 46 is placed in the down position, the photosensitive material 16 which is wound around the winding and guiding roller 26 is conveyed to the exposure ready portion 44. When the guide plate 46 is placed in the original (up) position, it guides the photosensitive material 16 toward the cutter 48.

The cutter 48 cuts the photosensitive material which has been wound around the winding and guiding roller 28 and conveyed. The pair of conveying rollers 50 conveys the cut photosensitive material 16. In this embodiment, the longitudinal length of the photosensitive material 16 which has been cut is 600 mm.

Downstream from the pair of conveying rollers 50, a pair of output rollers 52 are disposed. An output loop section 54 is disposed between the pair of output rollers 52 and the pair of conveying rollers 50. The output loop section 54 bends the photosensitive material 16 in a loop shape and keeps it in a ready state. The output rollers 52 output the photosensitive material 16 which is kept in the output loop section 54 to the outside of the apparatus.

Next, the operation of the apparatus according to the embodiment will be described.

When an image recording (exposing) process is performed, as a preparation stage, the nipping rollers 30 and 32 and the winding and guiding roller 28 are moved so as to be spaced apart from the rotating drum 24. In addition, the guide plate 46 is moved downwardly and placed in the down position. Thus, the photosensitive material 16 can be conveyed to the exposure ready portion 44.

Thereafter, the photosensitive material 16 is extracted from the photosensitive material magazine 14 by the feed roller 18. Next, the photosensitive material 16 is wound around the winding and guiding roller 26 and conveyed to the exposure ready portion 44. After the photosensitive material 16 has been conveyed to the exposure ready portion 44 by a predetermined length, the nipping rollers 30 and 32 and the winding and guiding roller 28 are moved to the rotating drum 24. However, the guide plate 46 is still in the down position. Thus, the exposure preparation process of the photosensitive material 16 is completed.

Next, the rotating drum 24 is reversely rotated so as to convey the photosensitive material 16 in the reverse direction and return the photosensitive material 16 which is kept in the exposure ready portion 44 to the exposure loop section 20. Thus, the photosensitive material 16 is bent in the loop shape by the exposure loop section 20 and returned. At this point, the exposing unit is activated so as to scan and record an image on the photosensitive material 16 which is wound on the outer circumference of the rotating drum 24 (namely, between the nipping rollers 30 and 32) by the laser diode (LD) or the like in the direction of arrow A of FIG. 2. The exposing process according to the so-called drum capstan method is thus performed.

After a predetermined image has been recorded (namely, the exposing process has been completed), the guide plate is moved to the original position. Thus, the leading edge of the photosensitive material 16 is guided to the cutter 48. Next, the rotating drum 24 is forwardly rotated and the conveying rollers 50 are driven. Thus, the photosensitive material 16 which has been exposed and bent in the loop shape is conveyed to the output loop portion 54. The output loop portion 54 bends the photosensitive material 16 in the loop shape and keeps it in a ready state. After the photosensitive material 16 has been conveyed by the predetermined length (namely, for one image) to the output loop portion 54, the cutter 48 is activated so as to cut the photosensitive material 16.

Thereafter, the output rollers 52 are driven so as to output the photosensitive material 16 which is kept in the output loop portion 54 to the outside of the material conveying apparatus 10. Next, the photosensitive material 16 is conveyed to another processing apparatus such as an automatic developing apparatus.

Thereafter, the above-described process is repeated for a predetermined number of images.

In the material conveying apparatus 10 according to this embodiment, the photosensitive material 16 is guided by the pair of winding and guiding rollers 26 and 28 and wound around the outer circumference of the rotating drum 24. Thereafter, the photosensitive material 16 is nipped and conveyed by the nipping rollers 30 and 32 which are in pressing contact with the winding portion of the photosensitive material 16 of the outer circumference of the rotating drum 24. Thus, the photosensitive material 16 is wound on a part of the outer circumference of the rotating drum 24 and conveyed. During the conveying process, an image is recorded on the photosensitive material 16.

Since the nipping rollers 30 and 32 are rubber rollers which deform according to the curvature of the rotating drum 24, they do not change the winding condition of the material 16 against the rotating drum 24. In addition, the nipping rollers 30 and 32 each have three roller portions 36, 38, and 40 which are independently rotatable, namely the nipping rollers 30 and 32 are divided into a plurality of portions along the axial line of the rotating drum 24. Thus, even if the conveying force (conveying velocity) at each portion of the material nipping portion along the axial line of the rotating drum 24 deviates because of, for example, a deviation of the outer diameter of each portion along the axial line of each of the nipping rollers 30 and 32 and a chance of the outer diameter of each portion thereof caused by expansion or shrinkage thereof due to a deviation of the nipping force, the deviation is absorbed by the roller portions 36, 38, and 40 of the nipping rollers 30 and 32 and does not affect each roller portion. Therefore, since only the conveying force is applied to the photosensitive material 16, it is uniformly conveyed without distortion. (In this embodiment, as described above, when the photosensitive material 16 whose width is 450 mm is conveyed in the longitudinal direction for 600 mm, the distortion thereof is 10 μm or less.)

Thus, an image is uniformly recorded onto the photosensitive material which is wound around the outer circumference of the rotating drum 24 and without distortion.

In particular, as in the so-called two-up process of a photoengraving process, when not only the repeatability of image but distortion of an exposed image directly affects the register tolerance, the image quality is remarkably improved due to absence of distortion. Thus, in this case, the present invention can be effectively used. Moreover, when a color image is recorded on a photosensitive material 16 by a plurality of reciprocative exposing processes, since the absence of distortion of the photosensitive material 16 during the conveying process results in no color distortion, the image quality is remarkably improved. Thus, in this case, the present invention can be effectively used.

Figure 6:
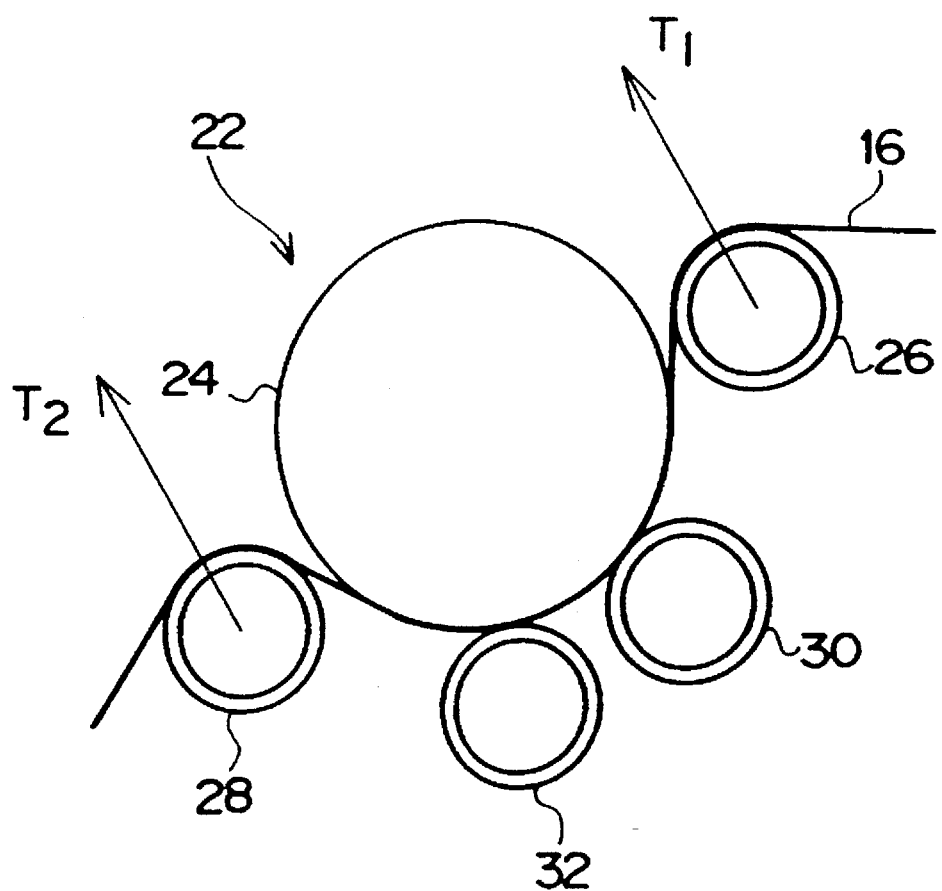
FIG. 6 is a sectional view showing winding and guiding rollers according to another modified example.

In the above-described embodiment, the winding and guiding rollers 26 and 28 are disposed at fixed positions and adapted to wind the photosensitive material 16 around the rotating drum 24. However, as shown in FIG. 6, by applying tensions in the directions of T1 and T2 to the winding and guiding roller 26 and roller 28, respectively, the photosensitive material 16 may be stably conveyed. Tension in the directions T1 and T2 are hereinafter referred to as tension T1 and T2, respectively. In this construction, the amount of tension T1 is preferably equal to that of the tension T2. In particular, when the photosensitive material 16 whose width is 450 mm is used, the total amount of tension T1 and T2 is preferably 300 grams or more.

In addition, the amount of tension T1 may not be equal to that of tension T2. Instead, the amount of tension T1 of the winding and guiding roller 26 disposed on the upstream side in the conveying direction of the photosensitive material may be larger than that of tension T2 of the winding and guiding roller 28 so as to apply tension to the photosensitive material 16 on the upstream side in the conveying direction. This tension is referred to a back-tension. With this construction, the photosensitive material 16 is prevented from moving outwardly in the radial direction of the rotating drum 24 between the nipping rollers 30 and 32. In this case, the difference between the amounts of tension T1 and T2 is preferably around 100 grams although the difference depends on the nipping forces of the nipping rollers 30 and 32.

Figure 10:
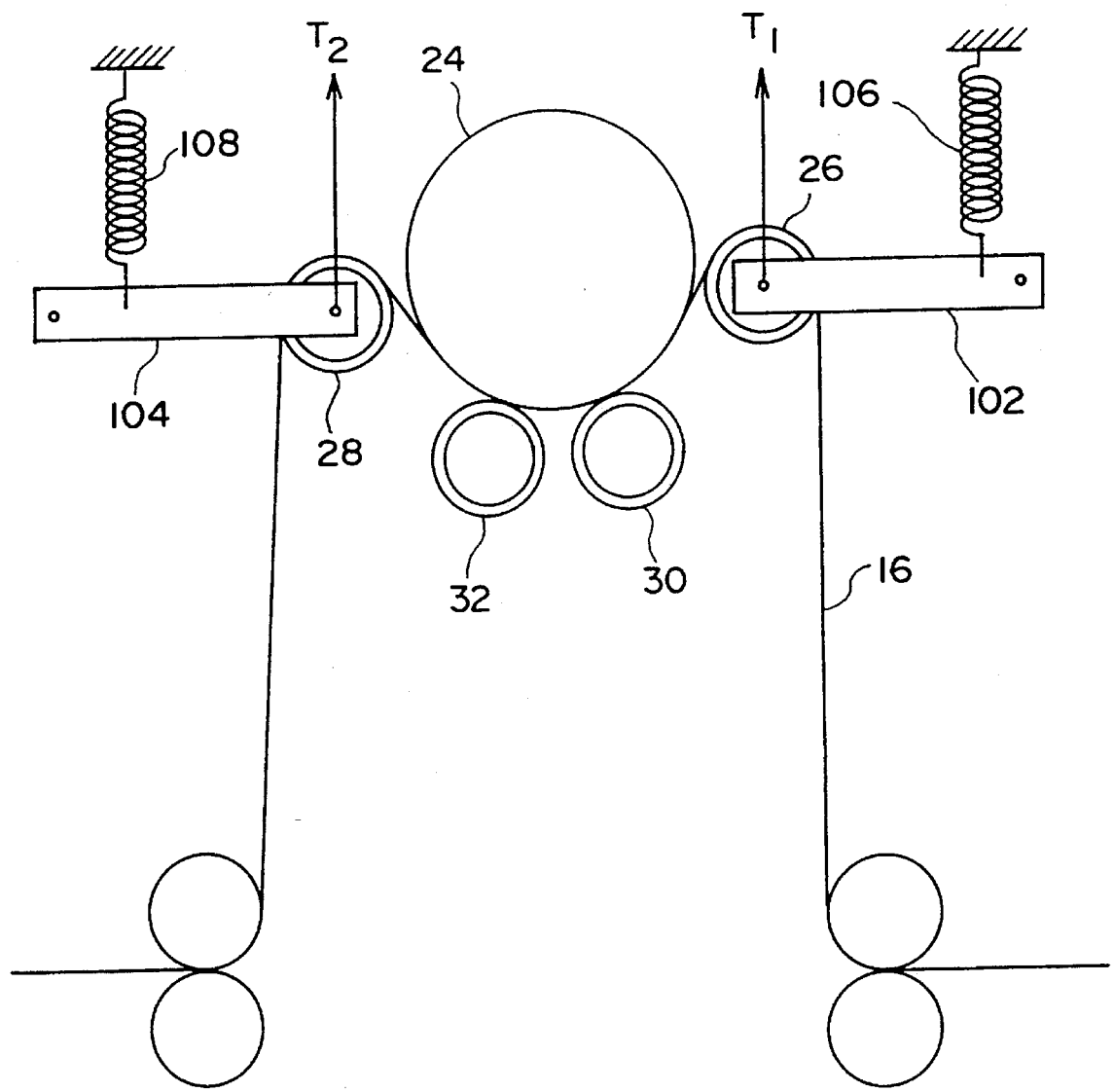
FIG. 10 is a sectional view schematically showing the construction of a principal portion (recording material conveying mechanism) of a material conveying apparatus according to another embodiment of the present invention.

FIG. 10 shows the construction of another example where tension T1 and T2 are applied to the winding and guiding rollers 26 and 28, respectively. In this construction, the winding and guiding rollers 26 and 28 are rotatably provided to first ends of arms 102 and 104, respectively. The second ends of the arms 102 and 104 are pivotably provided. At middle portions of the arms 102 and 104, coil springs 106 and 108 are disposed, respectively. The coil springs 106 and 108 apply tension T1 and T2 to the winding and guiding rollers 26 and 28, respectively.

The construction where a back-tension is applied to the photosensitive material 16 is not limited to the above-described embodiment. Instead, this construction may be accomplished by providing a brake (not shown) on the nipping roller 30 on the upstream side in the conveying direction of the photosensitive material 16. The brake suppresses the rotation of the nipping roller 30.

In the above-described embodiment, the outer diameters of the roller portions 36, 38, and 40 of each of the nipping rollers 30 and 32 are all 25 mm. However, the outer diameter of the roller portion 38 may be larger than the outer diameters of the roller portions 36 and 40 so that the nipping forces of the photosensitive material 16 by the nipping rollers 30 and 32 and the rotating roller 24 are kept constant. In this construction, since the roller portions 36, 38, and 40 rotate independently of each other, the photosensitive material 16 is free from distortion. In this construction, the difference between the outer diameter of the roller portion 38 and the outer diameters of the roller portions 36 and 40 is approximately 0.2 mm.

Moreover, in the above-described embodiment, the nipping rollers 30 and 32 have the three roller portions 36, 38, and 40 which are independently rotatable. However, the present invention is not limited to the nipping rollers 30 and 32. Rollers which give only a conveying force to the photosensitive material 16 (namely, the material) and absorb the difference of the force in the axial direction and the rotating force in the axial direction may be used.

Figure 7:
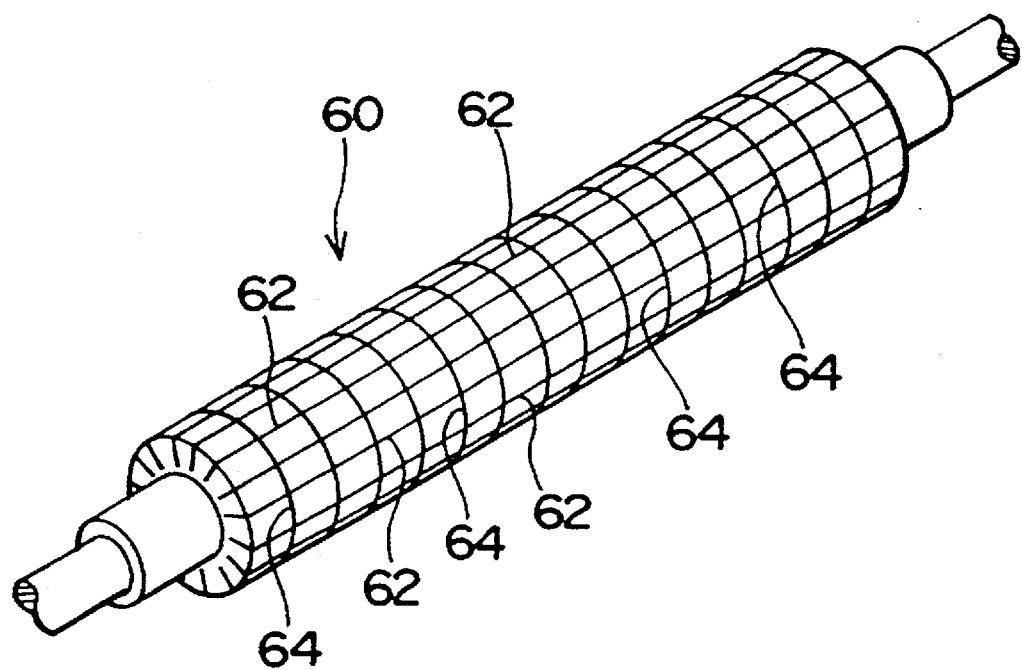
FIG. 7 is a perspective view showing a nipping roller according to another modified example.

For example, a nipping roller 60 shown in FIG. 7 may be used. The nipping roller 60 is a rubber roller. On the outer circumference of the nipping roller 60, a plurality of lateral grooves 62 and a plurality of longitudinal grooves 64 are formed in the axial direction and the circumferential direction, respectively. Thus, the nipping roller 60 is substantially divided into a plurality of portions. In this nipping roller 60, the lateral grooves 62 absorb a deviation of the conveying force (the conveying velocity) of each portion along the axial direction thereof. In addition, the longitudinal grooves 64 prevent a force from being transmitted to each portion along the axial line of the nipping roller 60.

Thus, even if the conveying force (conveying velocity) at each portion of the photosensitive material nipping portion along the axial line of the rotating drum 24 deviates because of for example a deviation of the outer diameter of each portion along the axial line of the nipping roller 60 and a variation of the conveying force caused thereby, each portion of the nipping roller 60 absorbs the deviation and does not affect each other. Thus, the photosensitive material 16 is equally conveyed. Therefore, an image is equally recorded onto the photosensitive material which is wound around the outer circumference of the rotating drum 24 without distortion.

Figure 8:
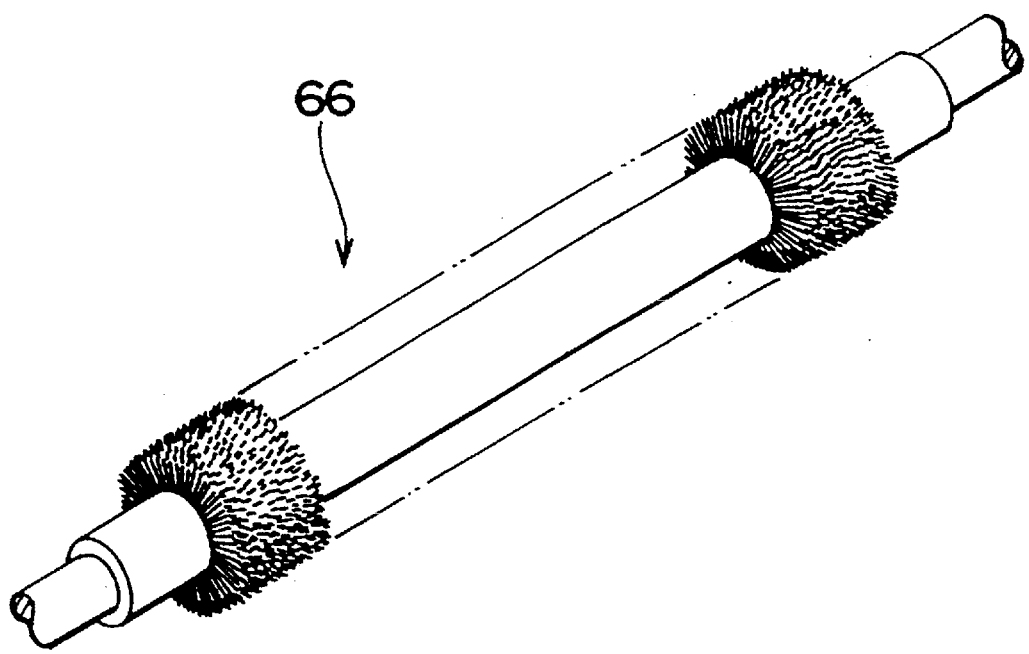
FIG. 8 is a perspective view showing a nipping roller according to a further modified example.

Furthermore, a nipping roller 66 shown in FIG. 8 may be used. The nipping roller 66 has a plurality of elastic protrusions which protrude radially from the rotating axis. This nipping roller 66 is a so-called brush roller. Thus, the outer circumference of the nipping roller 66 is substantially divided into a plurality of portions. In this nipping roller 66, the elastic protrusions absorb a deviation of the conveying force (the conveying velocity)of each portion along the axial direction thereof. In addition, the elastic protrusions prevent a force from being transmitted to each portion along the axial line of the nipping roller 66.

Thus, even if the conveying force (conveying velocity) at each portion of the photosensitive material nipping portion along the axial line of the rotating drum 24 deviates, the elastic protrusions of the nipping roller 66 absorb the deviation and do not affect each other. Thus, the photosensitive material 16 is uniformly conveyed. Therefore, an image is uniformly recorded onto the photosensitive material which is wound around the outer circumference of the rotating drum 24 without a distortion.

Figure 9:
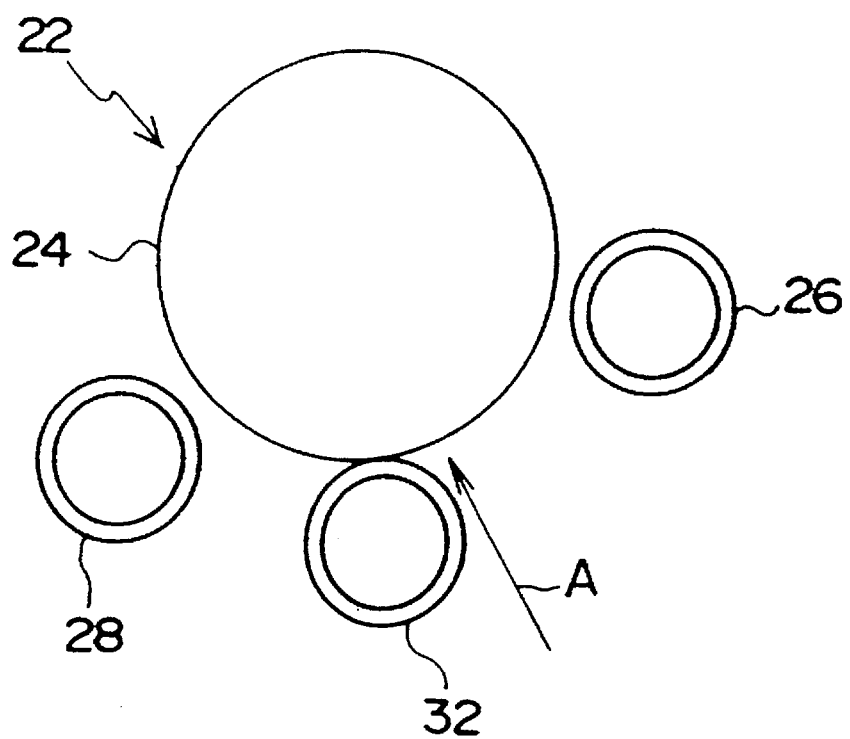
FIG. 9 is a sectional view according to FIG. 2 and showing the construction of a material conveying apparatus.

In the above-described embodiment, the photosensitive material 16 as the material is nipped and conveyed by the pair of nipping rollers 30 and 32. However, the present invention is not limited to this construction. As shown in FIG. 9, the photosensitive material 16 may be nipped and conveyed by only one nipping roller (for example, the nipping roller 32) rather than the pair of nipping rollers 30 and 32. In this case, an image may be exposed and recorded on the front side (in the direction of arrow A of FIG. 9) of the photosensitive material 16 which is wound on the outer circumference of the rotating drum 24 upstream (on the side of the winding and guiding roller 26) from the nipping roller 32.

Furthermore, in the above embodiment, the material conveying apparatus 10 which winds the photosensitive material 16 as the material around the rotating drum 24, conveys it, and records an image onto the photosensitive material 16 is described. However, the present invention is not limited to the material conveying apparatus 10. Rather, the present invention may be applied to an image recording apparatus which conveys a recording material on which an image or the like has been recorded and reads the image or the like therefrom.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present; invention.

What is claimed is:

1. A material conveying apparatus, comprising:

a rotating drum;

a pair of winding and guiding rollers, spaced apart from said rotating drum, for guiding a length of material according to a curvature of said rotating drum and for winding said material around a part of an outer circumference of said rotating drum; and at least one nipping roller having an elastic member in contact with the outer circumference of said rotating drum and deformed according to the curvature of said rotating drum, wherein said at least one nipping roller has a plurality of roller portions disposed along an axial direction of said rotating drum, wherein said roller portions are independently rotatable, wherein said at least one nipping roller is pressed into contact with the outer circumference of said rotating drum at a material winding portion so that said at least one nipping roller rotates correspondingly with respect to said rotating drum at said material winding portion, wherein said at least one nipping roller is pressed into contact with said material which is wound around the outer circumference of said rotating drum, said material being guided by said pair of winding and guiding rollers, wherein said at least one nipping roller is disposed such that said material is nipped between said rotating drum and said at least one nipping roller when said material is being conveyed, wherein said at least one nipping roller is designed such that said nipping roller eliminates a conveying force in said axial direction of said rotating drum to prevent said material from laterally moving in said axial direction of said rotating drum, and wherein said at least one nipping roller applies a conveying force in a conveying direction to said material.

2. The material conveying apparatus as set forth in claim 1, wherein each of said roller portions has a bearing disposed between a rotating shaft of said at least one nipping roller and said elastic member.

3. The material conveying apparatus as set forth in claim 1, wherein an outer diameter of an intermediate roller portion disposed at an intermediate portion of said roller portions is larger than outer diameters of the other roller portions.

4. The material conveying apparatus as set forth in claim 1, wherein said at least one nipping roller is a rubber roller divided into a plurality of roller portions in an axial direction and a circumferential direction of said at least one nipping roller.

5. The material conveying apparatus as set forth in claim 1, wherein said at least one nipping roller is a brush roller having a plurality of elastic protrusions protruding radially from a center of an axis of said at least one nipping roller.

6. The material conveying apparatus as set forth in claim 1, wherein said apparatus comprises two nipping rollers which are disposed at two positions in the conveying direction of said material.

7. The material conveying apparatus as set forth in claim 6, wherein at least one of said pair of winding and guiding rollers is disposed such that at least one portion of said at least one of said pair of winding and guiding rollers protrudes further toward said rotating drum than a line which is tangential to said rotating drum and which is orthogonal to a line which connects an axis of said rotating drum and an axis of said nipping roller which is adjacent to at least one of said pair of winding and guiding rollers and wherein each of said pair of winding and guiding rollers is disposed such that a distance between said rotating drum and said winding and guiding rollers is greater than or equal to a thickness of said material.

8. The material conveying apparatus as set forth in claim 6, wherein, at a region between at least one of said pair of winding and guiding rollers and said nipping roller adjacent to said at least one of said pair of winding and guiding rollers, a distance in a direction of said at least one of said pair of winding and guiding rollers from a nipping region, at which said nipping roller is pressed into contact with the outer circumference of said rotating drum, to a contacting region, at which said material contacts the outer circumference of said rotating drum, is greater than or equal to 5 mm.

9. The material conveying apparatus as set forth in claim 6, wherein a first nipping roller is disposed on an upstream side in the conveying direction of said material and said first nipping roller comprises a brake for suppressing rotations of said first nipping roller.

10. The material conveying apparatus as set forth in claim 1, further comprising:

urging means for applying an urging force to said winding and guiding rollers so that said material wound around said rotating drum is usually urged in an upstream direction and in a downstream direction in the conveying direction of said material.

11. The material conveying apparatus as set forth in claim 10, wherein said urging means is provided so that an upstream urging force which urges said material in the upstream direction is equal to a downstream urging force which urges said material in the downstream detection.

12. The material conveying apparatus as set forth in claim 10, wherein said urging means is provided so that an upstream urging force which urges said material in the upstream direction is greater than a downstream urging force which urges said material in the downstream direction.

13. A material conveying method, comprising the steps of:

disposing a pair of winding and guiding rollers, spaced apart from a rotating drum, for winding and guiding a material;

guiding and winding said material around a part of an outer circumference of said rotating drum according to a curvature of said rotating drum by said pair of winding and guiding rollers;

disposing a nipping roller at a winding portion of said material on said rotating drum, wherein said nipping roller is in pressing contact with the outer circumference of said rotating drum and rotated corresponding to said rotating drum, wherein said nipping roller is designed such that said nipping roller eliminates a conveying force in an axial direction of said rotating drum to prevent said material from laterally moving in said axial direction of said rotating drum, wherein said nipping roller is pressed into contact with said material which is wound around the outer circumference of said rotating drum, said material being guided by said pair of winding and guiding rollers, and nipping said material by said rotating drum and said nipping roller so that said material is conveyed only by a conveying force in a conveying direction.

14. The material conveying method as set forth in claim 13, wherein said nipping roller has a plurality of roller portions disposed along the axial direction of said rotating drum so as to disable the conveying force in the axial direction of said rotating drum.

15. The material conveying method as set forth in claim 13, wherein said nipping roller has an elastic member disposed on an outer circumference of said nipping roller, said elastic member being deformed according to the curvature of said rotating drum when said elastic member is in pressing contact with said rotating drum so as to disable the conveying force along the axial direction of said rotating drum.

16. A material processing apparatus, comprising:

a rotating drum;

a pair of winding and guiding rollers, spaced apart from said rotating drum, for guiding a length of material according to a curvature of said rotating drum and for winding said material around a part of an outer circumference of said rotating drum;

at least one nipping roller having an elastic member in contact with the outer circumference of said rotating drum and deformed according to the curvature of said rotating drum, wherein said at least one nipping roller has a plurality of roller portions disposed along an axial direction of said rotating drum, wherein said roller portions are independently rotatable, wherein said at least one nipping roller is pressed and contacted onto a winding portion of said material, wherein said winding portion is a part of said material disposed against the outer circumference of said rotating drum, wherein said at least one nipping roller is pressed against the outer circumference of said rotating drum at said winding portion so that said at least one nipping roller rotates correspondingly with respect to said rotating drum at said winding portion, wherein said at least one nipping roller is pressed into contact with said material which is wound around the outer circumference of said rotating drum, said material being guided by said pair of winding and guiding rollers, wherein said at least one nipping roller is disposed such that said material is nipped between said rotating drum and said at east one nipping roller, wherein said at least one nipping roller is designed such that said nipping roller eliminates a conveying force in said axial direction of said rotating drum to prevent said material from laterally moving in said axial direction of said rotating drum, and wherein said at least one nipping roller applies a conveying force in a conveying direction to said material; and image recording and reading means for performing one of an image recording process and an image reading process for said material conveyed at said material winding portion.

17. The material processing apparatus as set forth in claim 16, wherein said image recording and reading means is adapted to perform said image recording process by a laser diode.

* * * * *